US006796711B2

(12) United States Patent
Colson et al.

(10) Patent No.: US 6,796,711 B2
(45) Date of Patent: Sep. 28, 2004

(54) CONTACT TEMPERATURE PROBE AND PROCESS

(75) Inventors: Michael Bruce Colson, Woodbine, MD (US); Aseem Kumar Srivastava, Gaithersburg, MD (US)

(73) Assignee: Axcelis Technologies, Inc., Beverly, MA (US)

( * ) Notice: Subject to any disclaimer, the term of this patent is extended or adjusted under 35 U.S.C. 154(b) by 0 days.

(21) Appl. No.: 10/113,554

(22) Filed: Mar. 29, 2002

(65) Prior Publication Data

US 2003/0185280 A1 Oct. 2, 2003

(51) Int. Cl.[7] ............ G01K 7/06; H01L 35/08; H01L 35/32
(52) U.S. Cl. .......... 374/179; 374/208; 374/163; 374/165; 136/233
(58) Field of Search ................. 374/179, 208, 374/163, 165, 141, 185, 183; 136/233, 232, 230, 221

(56) References Cited

U.S. PATENT DOCUMENTS

| | | | | |
|---|---|---|---|---|
| 4,241,289 A | * | 12/1980 | Bowling | 136/230 |
| 4,265,117 A | * | 5/1981 | Thoma et al. | 374/179 |
| 4,279,154 A | * | 7/1981 | Nakamura | 374/179 |
| 5,088,836 A | * | 2/1992 | Yamada et al. | 374/183 |
| 5,177,332 A | * | 1/1993 | Fong | 426/107 |
| 5,321,719 A | * | 6/1994 | Reed et al. | 374/208 |
| 5,356,218 A | * | 10/1994 | Hopson et al. | 374/124 |
| 5,492,482 A | | 2/1996 | Lockman et al. | 439/329 |
| 5,492,761 A | * | 2/1996 | Shukushima | 428/379 |
| 5,527,111 A | * | 6/1996 | Lysen et al. | 374/208 |
| 5,567,909 A | | 10/1996 | Sugarman et al. | 136/201 |
| 5,696,348 A | | 12/1997 | Kawamura et al. | 136/230 |
| 5,791,782 A | | 8/1998 | Wooten et al. | 374/208 |
| 5,806,980 A | * | 9/1998 | Berrian | 374/179 |
| 5,999,081 A | * | 12/1999 | Hannigan et al. | 374/208 |
| 6,102,565 A | | 8/2000 | Kita et al. | 374/179 |
| 6,190,040 B1 | * | 2/2001 | Renken et al. | 374/208 |
| 6,204,484 B1 | | 3/2001 | Tay et al. | 219/411 |
| 6,257,758 B1 | * | 7/2001 | Culbertson | 374/179 |
| 6,325,858 B1 | * | 12/2001 | Wengert et al. | 136/232 |
| 6,332,709 B1 | | 12/2001 | Burke et al. | 374/179 |
| 6,464,393 B2 | * | 10/2002 | Tatoh | 374/179 |
| 6,529,362 B2 | * | 3/2003 | Herchen | 361/234 |
| 2001/0046112 A1 | | 11/2001 | Herchen | 361/234 |
| 2003/0231698 A1 | * | 12/2003 | Yamaguchi et al. | 374/179 |

* cited by examiner

Primary Examiner—Diego Gutierrez
Assistant Examiner—Stanley J. Pruchnic, Jr.
(74) Attorney, Agent, or Firm—Cantor Colburn LLP

(57) ABSTRACT

A contact measurement probe for measuring a temperature of a substrate in a process environment includes a probe head having a contact surface made of a ceramic material or a polymeric material for contacting the substrate. The contact measurement probe eliminates electrical biasing effects in process environments that include an ion source, thereby providing greater accuracy and reproducibility in temperature measurement.

23 Claims, 2 Drawing Sheets

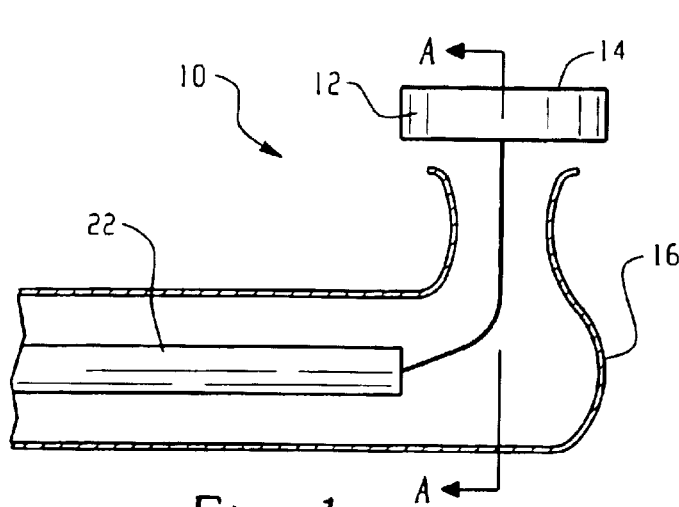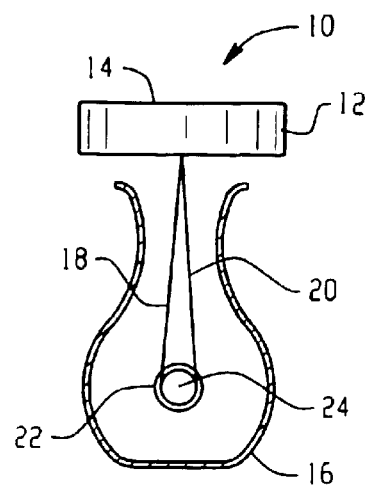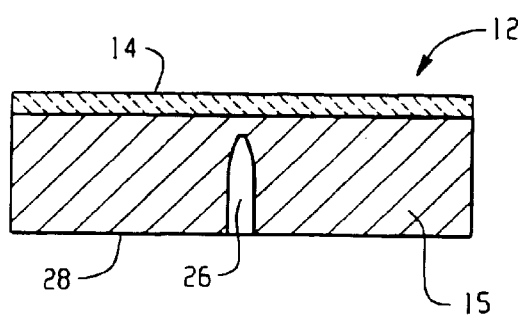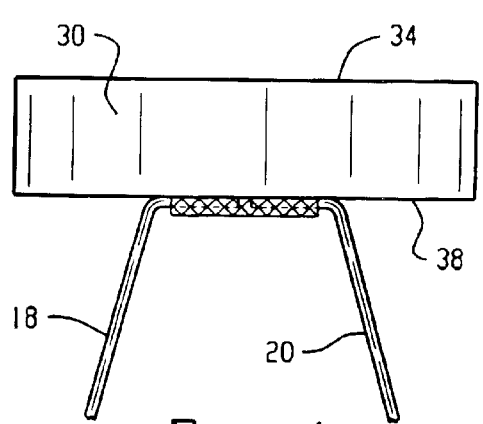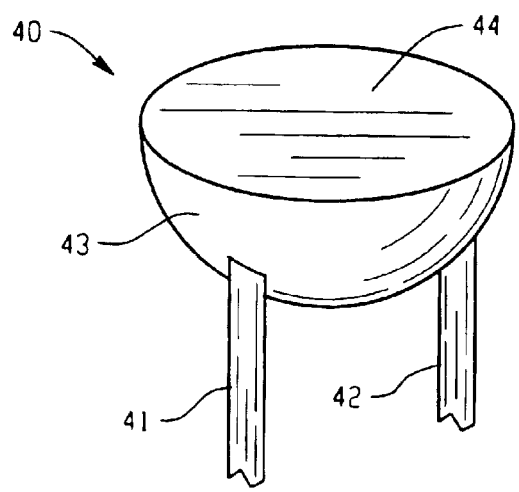

CONTACT TEMPERATURE PROBE AND PROCESS

BACKGROUND OF THE INVENTION

The present disclosure relates to a contact temperature probe for measuring a temperature of a semiconductor substrate.

During the manufacture of semiconductor devices, a substrate is frequently exposed to elevated temperatures during processing. Examples of such processes include plasma ashing of photoresist, chemical vapor deposition, annealing, and the like. Some of these processes include an ion source, which introduces an ion flux to the substrate surface during processing. It is generally desirable to monitor the temperature during these and other processes since temperature often impacts the quality and success of the process. Moreover, the measurement equipment used for monitoring the temperature should provide accurate and reproducible readings with minimal or no delay.

Contact temperature measurement is one such technique that is often used to monitor the temperature of the semiconductor substrate during processing. Contact temperature measurement techniques typically include contacting the substrate with a probe containing a temperature sensor. The probe is typically fabricated from materials that possess high thermal conductivity, such as aluminum. Many of the advances in contact measurement are directed to improving the accuracy of the temperature readings as well as the response times.

In U.S. Pat. No. 5,791,782 to Wooten et al. and U.S. Pat. No. 6,332,709 to Burke et al., contact temperature measurement probes are disclosed having a probe head which pivots under the weight of a semiconductor substrate so as to maintain close contact therewith. The pivoting probe head reduces contact resistance between the substrate and the probe head resulting in greater accuracy in the temperature measurements. Thermally isolating temperature sensor wires extending from the probe head provides further improvements.

In the methods and apparatus described in these and other patents, accurate temperature measurements can be obtained in a variety of processing environments. However, it has been determined that inaccuracies in the temperature measurement can occur in processing environments that include an ion source. Semiconductor manufacturing processes that include an ion source have a propensity to charge the substrate during processing. That is, ions can contact the substrate and form a low voltage potential in the substrate. Contact temperature measurement probes fabricated from thermally conductive metals such as aluminum, although suitable for providing sufficient thermal conductivity, are also electrically conductive. As a result, the low voltage potential formed in the substrate by the ions is recorded by the temperature sensor creating a bias in the displayed temperature readings. Thus, these methods and apparatus may not be suitable for semiconductor manufacturing processes that include an ion flux to the substrate surface and require accurate monitoring of the temperature.

SUMMARY OF THE INVENTION

Disclosed herein is an apparatus and process for measuring a temperature of a substrate in a processing environment. In one embodiment, a contact measurement probe in accordance with the present disclosure comprises a probe head having a contact surface made of a ceramic material for contacting a substrate; and a temperature sensor having lead wires which exit the probe head and run through a shield for shielding the wires from the process environment, wherein the probe head is supported only by the temperature sensor lead wires and the shield does not touch the probe head. Preferably, the ceramic material is selected from the group consisting of AlN, BeO, and combinations comprising at least one of the foregoing ceramic materials.

In another embodiment, the contact measurement probe comprises a probe head comprising a unitary monolith of a ceramic material and a temperature sensor in thermal communication with the probe head. The temperature sensor comprises lead wires that run through a shield for shielding the wires from the process environment, wherein the probe head is supported only by the temperature sensor lead wires and the shield does not touch the probe head.

In another embodiment, a probe head for the contact temperature probe comprises an electrically conductive pad; and a ceramic material or polymeric material disposed on a contact surface of the pad, wherein the ceramic material is selected from the group consisting of AlN, BeO, and combinations comprising at least one of the foregoing ceramic materials, and wherein the polymeric material is selected from the group consisting of polyimides, and polyetheretherketones.

In another embodiment, a contact temperature probe comprises a probe head made of a ceramic or polymeric material having an electrical resistivity greater than or equal to about $1\times10^6$ ohm-cm and a thermal conductivity greater than or equal to about 100 W/m-K at 100° C.; and a temperature sensor in contact with the probe head having lead wires that run through a shield for shielding the wires from the process environment, wherein the probe head is supported only by the temperature sensor lead wires and the shield does not touch the probe head.

A contact temperature measurement process for eliminating electrical bias in a process environment that includes an ion source comprises contacting a substrate with a contact measurement probe comprising a probe head and a temperature sensor, wherein the probe head comprises a flat contact surface made of a ceramic material, wherein the temperature sensor has lead wires which exit the probe head and run through a shield for shielding the wires from the process environment, and wherein the probe head is supported only by the temperature sensor lead wire and the shield does not touch the probe head; generating a thermoelectric voltage in the temperature sensor as a function of temperature, wherein the thermoelectric voltage is free from electrical bias; and converting the thermoelectric voltage to an actual temperature of the semiconductor substrate.

The above described and other features are exemplified by the following figures and detailed description.

BRIEF DESCRIPTION OF THE DRAWINGS

Referring to the exemplary drawings wherein like elements are numbered alike in the several Figures:

FIG. 1 is a side view of a contact thermocouple probe;

FIG. 2 is a vertical view of the contact thermocouple probe taken along lines A—A of FIG. 1;

FIG. 3 is a cross sectional view of a probe head including a ceramic contact surface;

FIG. 4 is a perspective view of a monolithic probe head with lead wires soldered thereto;

FIG. 5 is a perspective view of a welded probe head; and

DETAILED DESCRIPTION OF THE PREFERRED EMBODIMENTS

Figure 6:
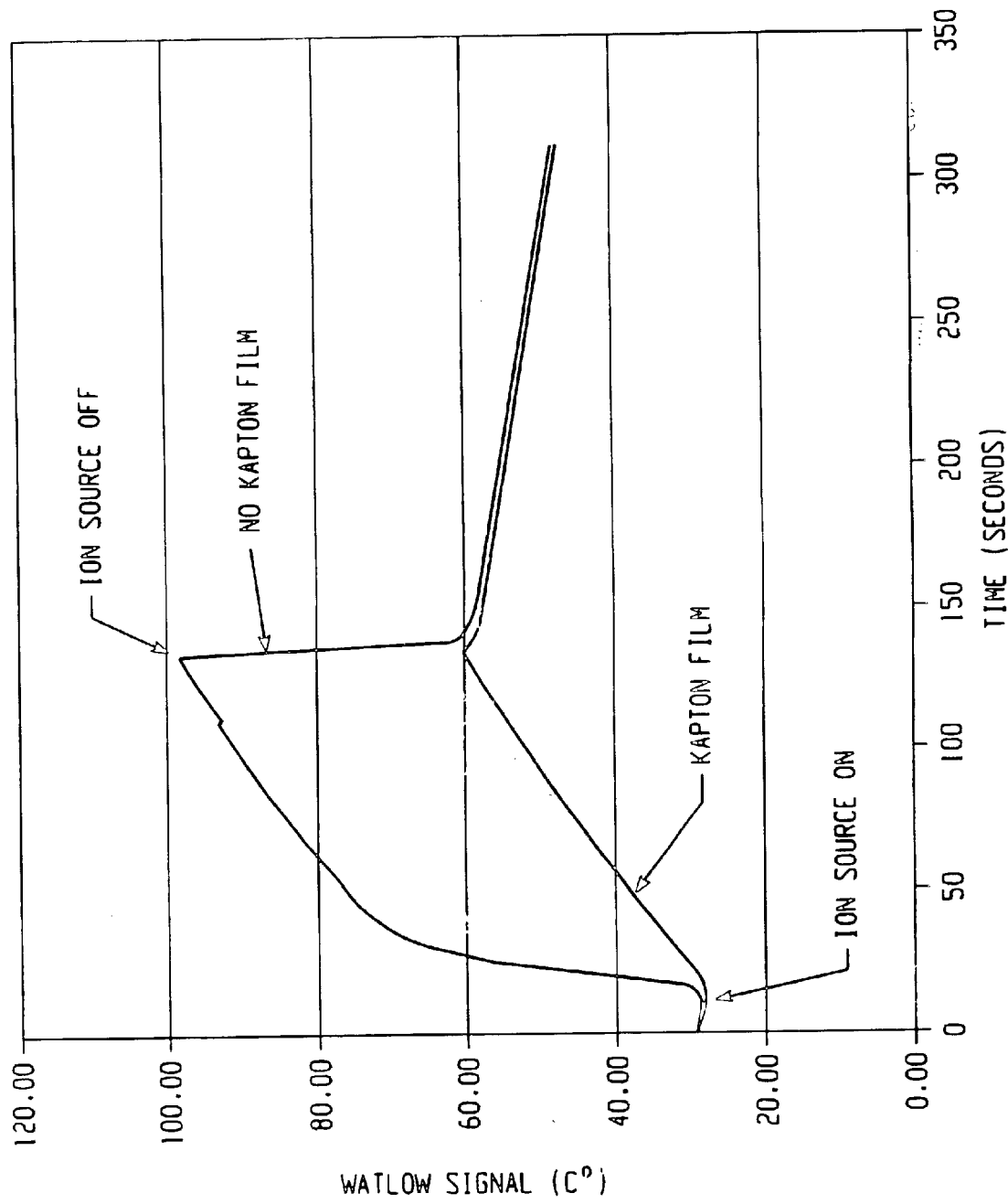
FIG. 6 is a graph illustrating the effect of an ion source on temperature measurement as a function of time.

Referring now to FIGS. 1 and 2, there is shown an exemplary contact measurement probe generally designated 10 for use in monitoring temperatures during processes utilized in the manufacture of semiconductor devices. The exemplary contact measurement probe 10 includes a probe head 12 having a electrically insulative and thermally conductive contact surface 14 for contacting a semiconductor substrate during temperature measurement, and a quartz shield 16 for shielding the temperature sensor wires 18, 20 from the process environment. Preferably, the contact surface conforms to the surface topography of the semiconductor surface upon which it contacts, e.g., flat. Advantageously, the electrically insulative and thermally conductive contact surface 14 provides greater temperature measurement accuracy in process environments that include an ion source by eliminating biasing effects caused by the ion sources. The contact measurement probe 10 disclosed herein can also provide accurate temperature measurements in process environments that do not include an ion source such as may be encountered in plasma mediated processes, annealing processes, chemical vapor deposition processes, and the like.

The contact measurement probe 10 includes a probe head 12 that is supported by temperature sensor wires 18 and 20, and is thermally isolated from the quartz shield 16. The thermal isolation of the probe head 12 reduces the effective thermal mass and causes the temperature sensor to more closely follow the temperature of the semiconductor substrate. At the same time, the contact measurement probe 10 pivots under the weight of the semiconductor substrate, thereby providing intimate contact between the contact surface 14 of the contact measurement probe 10 and the semiconductor substrate.

The quartz shield 16 encloses a stainless steel tube 22 that protects the temperature sensor wires 18, 20 from extraneous electrical signals. Within the stainless steel tube 22 is a ceramic tube 24 having two longitudinally extending openings through which the wires 18 and 20 are run. The ceramic tube provides heat insulation for the thermocouple wires 18, 20 and also prevents the wires 18, 20 from touching each other. An additional thermocouple junction would undesirably result if the wires 18, 20 were to touch causing inaccurate temperature measurements.

In a preferred embodiment, the temperature sensor is a thermocouple. As is known to those skilled in the art, a thermocouple consists of a junction of two dissimilar metals with wire leads connected to each half of the junction. The thermocouple generates a thermoelectric voltage that is a function of the junction temperature and the choice of particular metals that form the junction. Because the thermoelectric voltage generated as a function of temperature can be determined for a particular thermocouple junction, a voltage-measuring instrument can be used to measure the junction voltage and convert the voltage measurement into corresponding temperature information through a simple voltage to temperature conversion algorithm. A variety of different metals for use in the thermocouple junction have been employed depending on the application. Typical selection parameters for thermocouple types include the anticipated temperature range of the measurement application and the required measurement accuracy. "E-type", "J-type", and "K-type" thermocouples are examples of commonly available thermocouples, which have well known characteristics in the industry for temperature range and accuracy. Temperature measurement instruments that utilize thermocouple probes will commonly accept E-type, J-type, and K-type thermocouples and provide proper conversion of the measured junction voltage into a temperature reading according to standard temperature and voltage tables.

FIG. 3 illustrates a cross sectional view of the probe head 12. The probe head 12 is shown as being generally disk shaped and includes the flat contact surface 14 disposed on a body portion 15. In one embodiment, the contact surface 14 of the probe head 12 comprises a ceramic material. The ceramic material is preferably at a thickness effective to simultaneously provide electrical resistivity and thermal conduction. In a preferred embodiment, the ceramic contact surface 14 is flat. Although the body portion 15 is shown as having a flat surface upon which the ceramic material is disposed, the body portion 15 and its surfaces are not intended to be limited to any particular shape. The body portion 15 may have a flat surface or an irregularly shaped surface. Moreover, the ceramic material may be disposed on non-contact surfaces without detracting from its utility.

In another embodiment, the electrically insulative and thermally conductive contact surface 14 comprises a polymer. The polymer may be coated or adhesively affixed to the body portion 15.

The body portion 15 can be fabricated from any suitable thermally conductive material, e.g., ceramics, metals, and the like. In a preferred embodiment, the body portion 15 is fabricated from a metal such as aluminum, gold, copper, silver, combinations comprising at least one of the foregoing metals, and the like. Of these, aluminum metal is most preferred in view of its cost and ease in which it can be machined. The thermal conductivity of aluminum is about 235 W/m-K at 100° C. In the case of a metallic body portion, a centered, axial, blind hole 26 preferably extends from lower surface 28 of the body portion 15. The temperature sensor, e.g., thermocouple junction, is inserted into hole 26. The hole 26 is then collapsed by a crimping operation around the thermocouple as described in U.S. Pat. No. 5,791,782, incorporated herein by reference in its entirety. This creates good electrical contact between the two wires 18, 20 at the junction and good thermal contact between the probe head 12 and the temperature sensor.

In combination with the probe head 12 shown in FIG. 3, the sensor wires 18 and 20 form two legs of a triangle having an apex at the probe head 12. The wires 18, 20 are of suitable stiffness to support the probe head 12 by themselves while allowing pivoting of the head 12 about the thermocouple junction under weight of the semiconductor substrate.

In an alternative embodiment shown in FIG. 4, a probe head 30 is preferably fabricated from a monolith of ceramic material, i.e., a solid disk, having a contact surface 34. Since many ceramic materials suitable for forming the probe head 30 are inherently brittle, it is preferred that the thermocouple junction is welded to provide good electrical contact between the two wires 18, 20 at the junction and good thermal contact between the probe head 30 and the temperature sensor. In this manner, it is preferred that a metallic paste or ink is first applied to a non-contact surface of the probe head 30, and more preferably, is applied to the lower surface 38 of the probe head, i.e., the non-contact surface diametrically opposed to the contact surface. The metallic paste or ink is then heated to a temperature sufficient to metallize the surface and fixedly attach the metal to the ceramic surface. The temperature sensor, e.g., thermocouple junction is then soldered to the metallized surface formed by the metallic paste or ink. Optionally, the soldered area is selectively coated with a thin layer of aluminum or the like to provide protection in the processing environment so that metals in the solder may not be emitted on to the substrate, which could deleteriously contribute to metals contamination.

The metallic ink is electrically and thermally conductive and provides contact between the temperature sensor and the probe head. Suitable metallic pastes and inks include copper, gold, silver, manganese, molybdenum, aluminum, palladium, platinum, combinations comprising at least one of the foregoing metals, or the like. In a preferred embodiment, the metallic paste or ink comprises a mixture of manganese and molybdenum.

FIG. 5 illustrates an alternative embodiment of a probe head 40. In this embodiment, two wires of dissimilar materials 41, 42 are intertwined forming a thermocouple junction. A weld 43 of a metallic material such as aluminum then encompasses the intertwined wires. A top surface 44 of the weld 43 is made flat. The flat surface 44 is then coated with a ceramic material or polymeric material in the manner previously described. The contact surface 44 of the probe head 40 contacts the semiconductor substrate during temperature measurement.

Contacting the semiconductor substrate with the contact surface 14, 34, 44 effectively eliminates electrical biasing effects that may occur during processes that employ an ion source. In other words, the low voltage potential formed in the semiconductor substrate upon exposure to ions is not transferred to the probe head clue to the electrical resistivity provided by the ceramic contact surface 14, 34, 44, thereby insulating the temperature sensor, e.g., thermocouple junction, from the low voltage potential of the semiconductor substrate. Moreover, since the contact surface is preferably chosen to be thermally conductive, accurate and reproducible temperature readings can be obtained with minimal or no delay in response times. Under certain circumstances, the use of ceramic or polymeric materials may cause an offset between an actual wafer temperature and that measured by the thermocouple. In such a case, an independent temperature measurement or calibration procedure can be used to track and encode the offset into the temperature controller software.

Preferably, the ceramic or polymeric material is selected to have an electrical resistivity greater than about $1 \times 10^6$ ohm-cm, with greater than about $1 \times 10^{10}$ ohm-cm even more preferred, and with greater than about $1 \times 10^{16}$ ohm-cm most preferred. In combination with the electrical resistivity properties, the ceramic or polymeric material is preferably selected to have a thermal conductivity greater than about 100 W/m-K at 100° C., with greater than about 150 W/m-K at 100° C. oven more preferred, and with greater than about 200 W/m-K at 100° C. most preferred. In the embodiment where the contact surface 14 comprises a layer of ceramic material disposed on the probe head 12, it is preferred that a thickness of the layer be sufficient to provide sufficient electrical resistivity to eliminate electrical biasing as well as provide thermal conductivity.

Suitable ceramic materials include, but are not intended to be limited to, $AlN$, $Al_2O_3$, $BaTiO_3$, $BeO$, $BN$, $CaO$, $LaB_6$, $MgO$, $MoSi_2$, $Si_3N_4$, $SiO_2$, $Ta_2O_5$, $TiB_2$, $TiN$, $TiO_2$, $TiSi_2$, $VB_2$, $W_2B_3$, $WSi_2$, $ZrB_2$, $ZrO_2$, and combinations comprising at least one of the foregoing ceramic materials. Other suitable ceramic materials will be apparent to one of ordinary skill in the art in view of this disclosure. In a preferred embodiment, the ceramic material is selected from the group of ceramic materials consisting of AlN, BeO, and combinations comprising at least on of the foregoing ceramic materials. The ceramic material may be polycrystalline or monocrystalline.

Suitable polymeric materials include polyimides, polyetheretherketones, and the like. Suitable polyimides are commercially available as films from the E. I. du Pont de Nemours and Company under the trademark KAPTON®.

The ceramic material can be deposited onto the probe head by any number of methods including plasma thermal spray, vapor deposition, physical vapor deposition, chemical vapor deposition, sputtering, and the like. Monoliths of ceramic material can be fabricated using powder compaction and sintering methods.

Plasma thermal spray is basically the spraying of molten or heat softened material onto a surface to provide a coating. Material in the form of a powder is injected into a very high temperature plasma flame, where it is rapidly heated and accelerated to a high velocity. The hot material impacts onto the substrate surface and rapidly cools forming a coating.

Vapor deposition generally includes heating and vaporizing a substance in a vacuum, and depositing a layer of the substance onto a surface of a substrate to be treated, thereby forming a thin layer. For example, plasma vapor deposition generally includes heating a solid to a high temperature or vaporizing and condensing a solid forcibly, with no chemical reaction, to form a thin film. Chemical vapor deposition method generally includes forming a thin film by chemically reacting a vapor of a metal or a volatile compound in a gas phase.

Sputtering generally includes generating ionized plasma in a relatively low degree of vacuum, accelerating ionized argon, and causing collision of the argon with a target (a solid material which is a target of collision of the accelerated particles) to sputter target atoms, thereby coating the surface of a material to be treated.

Alternatively, the monolithic ceramic probe head can be fabricated using a mold. The ceramic material, in the form of a paste, is disposed in the mold. The mold is selected to conform to the desired shape of the probe head, e.g., disk shaped, with a diameter of about 2 mm, and a thickness of about 1 mm. A thermocouple junction is preferably inserted into the ceramic paste filled mold, which is then hardened. For example, the ceramic paste filled mold can be heated at a temperature sufficient to harden the ceramic paste, thereby fixing the thermocouple junction into the hardened ceramic. Advantageously, this process of fabricating the monolithic probe head avoids the steps of metallizing the surface and subsequently soldering the thermocouple to the monolithic ceramic probe head. Moreover, the thermocouple formed in this manner need not be coated with a protective layer, e.g., evaporated aluminum, since there is no solder utilized that can potentially contribute to metals contamination during exposure to the processing environment.

The following examples are presented for illustrative purposes only, and are not intended to limit the scope of the disclosure.

EXAMPLE 1

In this example, a contact measurement probe was fabricated. A probe head was first machined from aluminum in the shape of a disk. The probe head had a diameter of 2.03 millimeters (mm) and a thickness of 0.635 mm. A centered, axial hole was drilled in a lower surface to a depth of about 1.0 mm. A type K thermocouple was inserted into the hole and crimped. A layer of beryllium oxide (BeO) was then deposited onto the top surface under vacuum at a thickness of about 2,000 to about 8,000 angstroms (Å). Electrical resistivity of the BeO was greater than about $1 \times 10^{14}$ ohm-cm and its thermal conductivity was about 210 W/m-K at 100° C. Lead wires from the thermocouple were inserted into a stainless steel tube. Within the stainless steel tube is a ceramic tube having two longitudinally extending openings through which the lead wires are run. A quartz shield was then disposed about the stainless steel tube and exposed lead wires. The lead wires support the probe head by themselves while allowing pivoting of the head about the thermocouple junction under weight of the semiconductor substrate. In a similar manner, contact measurement probes were fabricated with AlN applied to the top surface of the aluminum pad into which the thermocouple bead had been crimped.

EXAMPLE 2

In this example, a contact measurement probe was fabricated with a monolithic probe head comprised of BeO. The probe head was made in the shape of a disk with a diameter of about 2.0 millimeters (mm) and a thickness of about 0.9 mm. A manganese-molybdenum ink was painted onto a flat surface of the probe head and heated to a temperature of about 1000° C. to form a metallized surface. A type K thermocouple was then soldered to the metallized surface using a high temperature solder. Prior to soldering, a junction of the thermocouple was flattened to generally conform to the metallized surface and increase the area of contact between the junction and the probe head. Aluminum nitride paste was then applied to the solder joint formed during soldering. Similar probes were fabricated wherein the solder joint was coated with a thin layer of evaporated aluminum. Lead wires from the thermocouple were inserted into a stainless steel tube. Within the stainless steel tube is a ceramic tube having two longitudinally extending openings through which the lead wires are run. A quartz shield was then disposed about the stainless steel tube and exposed lead wires.

EXAMPLE 3

In this example, substrate temperature was monitored in a processing environment that included exposure to an ion source. The contact temperature measurement probe was manufactured using an aluminum probe head. The contact temperature measurement probe, with and without a KAPTON® film covering the contact surface, was placed in contact with a semiconductor substrate. Temperature as a function of time was then monitored during a process that included an ion flux to the substrate surface. At about 20 seconds, the ion source was switched on in the processing chamber. At about 140 seconds, the ion source was switched off. As shown in FIG. 6, the contact temperature measurement probe without the KAPTON® film exhibited a false increase in the electrical signal received by a Watlow temperature controller as the ion flux bombarded the wafer. The Watlow temperature controller is a closed loop controller that controls power to a battery of halogen lamps for providing controlled heating to the semiconductor substrate. Upon switching off of the ion source, the signal for the contact temperature measurement probe without the KAPTON® film decreased resulting in a "false fall". In contrast, the temperature probe employing a KAPTON® film, showed no false readings upon introduction of the ion source. Thus, the low voltage developed on the wafer due to the presence of ion flux was insulated from the temperature sensor in the temperature probe. It is expected that similar results would be obtained with contact temperature measurement probes employing the ceramic contact surface in accordance with the present disclosure.

There are several advantages to using the contact temperature measurement probe including a probe head having a ceramic or polymeric contact surface as described herein. The ceramic or polymeric contact surface provides accurate and reproducible temperature measurements in process environments that include an ion source as demonstrated in FIG. 6. Moreover, the use of ceramic or polymeric materials permits an expanded operating range in terms of temperature. The melting point of aluminum is at about 600° C. Operating at about 300° C. or greater can cause softening of the aluminum pad leading to the exchange of metals to and from the pad and substrate. This deleterious "gettering" effect can cause metal contamination on the substrate as well as reduces the lifetime of the aluminum pad. Ceramics generally have much higher melting points, e.g., BeO has a melting point of about 2500° C., and are hard materials unlike aluminum. Moreover, the use of aluminum-based probes can lead to scraping of the contact surface of the semiconductor substrate. The scraping phenomena or other degradation has not been observed with contact temperature measurement probes utilizing ceramic or polymeric contact surfaces. Still further, the described ceramic and polymeric materials are generally oxidation resistant. In contrast, aluminum can readily oxidize, which has been known to progressively degrade the thermal contact between the wafer and thermocouple bead, thereby leading to measurement errors.

While the invention has been described with reference to a preferred embodiment, it will be understood by those skilled in the art that various changes may be made and equivalents may be substituted for elements thereof without departing from the scope of the invention. For example, although reference is made to a particular contact measurement probe, other types of probes can be used, wherein the portion that contacts the semiconductor substrate is electrically insulated with the ceramic material in the manner described. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A contact measurement probe for measuring a temperature of a substrate in a process environment, comprising:
a probe head having a contact surface made of a ceramic material for contacting a substrate; and
a temperature sensor having lead wires which exit the probe head and run through a shield for shielding the wires from the process environment, wherein the probe head is supported only by the temperature sensor lead wires and the shield does not touch the probe head.

2. The contact measurement probe according to claim 1, wherein the ceramic material is selected from the group consisting of AlN, $Al_2O_3$, $BaTiO_3$, BeO, BN, CaO, $LaB_6$, MgO, $MoSi_2$, $Si_3N_4$, $SiO_2$, $Ta_2O_5$, $TiB_2$, TiN, $TiO_2$, $TiSi_2$, $VB_2$, $W_2B_3$, $WSi_2$, $ZrB_2$, $ZrO_2$, and combinations comprising at least one of the foregoing ceramic materials.

3. The contact measurement probe according to claim 2, wherein the probe head is a monolith of the ceramic material.

4. The contact measurement probe according to claim 1, wherein the ceramic material has an electrical resistivity greater than or equal to about $1 \times 10^{10}$ ohm-cm and a thermal conductivity greater than or equal to about 100 W/m-K at 100° C.

5. The contact measurement probe according to claim 1, wherein the ceramic material has an electrical resistivity greater than or equal to about $1 \times 10^{10}$ ohm-cm and a thermal conductivity greater than or equal to about 150 W/m-K at 100° C.

6. The contact measurement probe according to claim 1, wherein the ceramic material has an electrical resistivity greater than or equal to about $1 \times 10^{12}$ ohm-cm and a thermal conductivity greater than or equal to about 200 W/m-K at 100° C.

7. The contact measurement probe according to claim 1, wherein the contact surface comprises AlN.

8. The contact measurement probe according to claim 1, wherein the contact surface comprises BeO.

9. A contact measurement probe for measuring a temperature of a substrate in a process environment, comprising:
   a probe head comprising a unitary monolith of a ceramic material; and
   a temperature sensor in thermal communication with the probe head, wherein the temperature sensor comprises lead wires that run through a shield for shielding the wires from the process environment, wherein the probe head is supported only by the temperature sensor lead wires and the shield does not touch the probe head.

10. The contact measurement probe according to claim 9, wherein the ceramic material is selected from the group consisting of AlN, $Al_2O_3$, $BaTiO_3$, BeO, BN, CaO, $LaB_6$, MgO, $MoSi_2$, $Si_3N_4$, $SiO_2$, $Ta_2O_5$, $TiB_2$, TiN, $TiO_2$, $TiSi_2$, $VB_2$, $W_2B_3$, $WSi_2$, $ZrB_2$, $ZrO_2$, and combinations comprising at least one of the foregoing ceramic materials.

11. The contact measurement probe according to claim 9, wherein the ceramic material has an electrical resistivity greater than or equal to about $1 \times 10^6$ ohm-cm and a thermal conductivity greater than or equal to about 100 W/m-K at 100° C.

12. The contact measurement probe according to claim 9, wherein the ceramic material has an electrical resistivity greater than or equal to about $1 \times 10^{10}$ ohm-cm and a thermal conductivity greater than or equal to about 200 W/m-K at 100° C.

13. The contact measurement probe according to claim 9, wherein the ceramic material has an electrical resistivity greater than or equal to about $1 \times 10^{12}$ ohm-cm and a thermal conductivity greater than or equal to about 200 W/m-K at 100° C.

14. The contact measurement probe according to claim 9, wherein the ceramic material comprises AlN.

15. The contact measurement probe according to claim 9, wherein the ceramic material comprises BeO.

16. A contact temperature probe comprising:
   a probe head comprising a contact surface made of a ceramic or polymeric material having an electrical resistivity greater than or equal to about $1 \times 10^6$ ohm-cm and a thermal conductivity greater than or equal to about 100 W/m-K at 100° C.; and
   a temperature sensor in contact with the probe head having lead wires that run through a shield for shielding the wires from the process environment, wherein the probe head is supported only by the temperature sensor lead wires and the shield does not touch the probe head.

17. The contact measurement probe according to claim 16, wherein the ceramic material is selected from the group consisting of AlN, BeO, and combinations comprising at least one of the foregoing ceramic materials.

18. The contact measurement probe according to claim 16, wherein the polymeric material is selected from the group consisting of polyimides and polyetheretherketones.

19. A contact temperature measurement process for eliminating electrical bias in a process environment that includes an ion source, the process comprising:
   contacting a charged substrate having a voltage potential with a probe head comprising a contact surface made of a ceramic material or a polymeric material and a temperature sensor having lead wires which exit the probe head and run through a shield for shielding the wires from the process environment, and wherein the probe head is supported only by the temperature sensor lead wire and the shield does not touch the probe head;
   generating a thermoelectric voltage in the temperature sensor as a function of a temperature of the charged substrate, wherein the thermoelectric voltage is electrically isolated from the voltage potential in the charged substrate due in part to the material of the contact surface of the probe head; and
   converting the thermoelectric voltage to the temperature of the charged substrate.

20. The process according to claim 19, wherein the ceramic material comprises AlN.

21. The process according to claim 19, wherein the ceramic material comprises BeO.

22. The process according to claim 19, wherein the probe head comprises a monolith of the ceramic material.

23. The process according to claim 19, wherein the polymeric material is selected from the group consisting of polyimides and polyetheretherketones.

* * * * *